(12) United States Patent
Filippini

(10) Patent No.: US 6,302,219 B1
(45) Date of Patent: Oct. 16, 2001

(54) EDGING BLADE FOR POWERED LANDSCAPING EDGERS

(76) Inventor: Pat Filippini, 883 Collegeville Rd., Collegeville, PA (US) 19426

( * ) Notice: Subject to any disclaimer, the term of this patent is extended or adjusted under 35 U.S.C. 154(b) by 0 days.

(21) Appl. No.: 09/550,066

(22) Filed: Apr. 14, 2000

(51) Int. Cl.[7] .................................................. A01B 45/00
(52) U.S. Cl. ........................... 172/15; 30/347; 30/DIG. 5
(58) Field of Search ............................... 172/15; 30/347, 30/353, DIG. 5, DIG. 7

(56) References Cited

U.S. PATENT DOCUMENTS

| | | | |
|---|---|---|---|
| 2,555,441 | * | 6/1951 | Hackney . |
| 2,630,747 | * | 3/1953 | Mintz . |
| 3,174,224 | * | 3/1965 | Rousselet . |
| 3,938,249 | * | 2/1976 | Chacon ........................ 30/DIG. 7 X |
| 4,002,205 | | 1/1977 | Falk ........................................ 172/15 |
| 4,072,195 | * | 2/1978 | Carlson ................................. 172/15 |
| 4,653,590 | * | 3/1987 | Shank .................................... 172/15 |
| 5,226,248 | | 7/1993 | Pollard .................................... 37/94 |
| 5,441,115 | | 8/1995 | Horzepa ................................ 172/15 |
| 6,062,318 | * | 5/2000 | Andrews ............................... 172/15 |

* cited by examiner

Primary Examiner—Christopher J. Novosad
(74) Attorney, Agent, or Firm—LaMorte & Associates

(57) ABSTRACT

An edger blade assembly for cutting a beveled edge using a motorized edging machine. The edger blade assembly is a structure that includes a blade element. The blade element has two opposing free ends. Between the two free ends is a flat middle section, two diverging sections that extend outwardly from the flat middle section and two converging sections that extend between the diverging sections and the two free ends, respectively. The blade element is bent at an acute angle between the flat middle section and the diverging sections. The blade element is bent at an obtuse angle between the diverging sections and the converging sections, thereby forming a beveled blade structure from a single segment of steel.

10 Claims, 2 Drawing Sheets

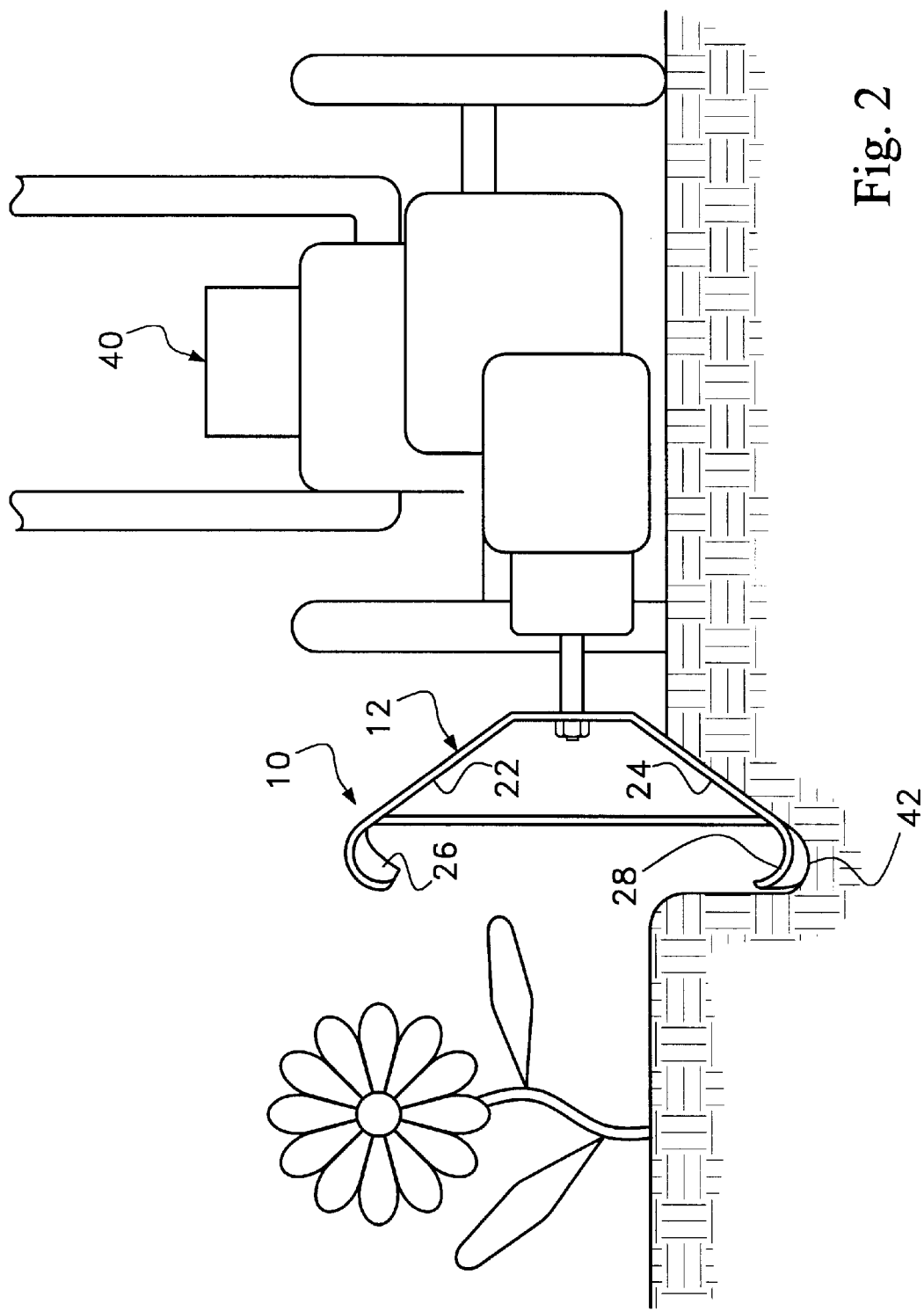

EDGING BLADE FOR POWERED LANDSCAPING EDGERS

BACKGROUND OF THE INVENTION

1. Field of the Invention

The present invention relates to blades that are used on motorized landscaping edgers: More particularly, the present invention relates to blades that enable motorized landscaping edgers to create a beveled edge along the edge of a lawn or garden.

2. Description of the Prior Art

Many homeowners and professional landscapers own motorized edging machines. Motorized edging machines contain small gasoline engines that turn a blade in the vertical plane. The blade is run along the edge of lawns and gardens to create a clean cut edge that is aesthetically pleasing.

In the prior art, blades for motorized edging machines are essentially flat. Accordingly, when these blades are used to cut an edge, the edge is perpendicular to the ground. However, in many instances a person may want the edge of their lawn or garden to be beveled so that the edge is not perpendicular to the ground. Often a landscaper or homeowner creates a beveled edge manually using a shovel or a flat spade. However, such manual work is highly labor and time intensive.

To a professional landscaper, time is money. The quicker a lawn or garden can be maintained, the quicker the landscaper can move on to other jobs. However, landscapers are expected to do professional looking jobs, which often means beveled garden and lawn edges. In an attempt to increase the speed and decrease the labor required to produce a beveled edge, landscapers have developed beveled blades that can be added to existing motorized edging machines, thereby eliminating much of the labor involved in producing a beveled edge.

U.S. Pat. No. 5,441,115 to Horzepa, entitled, Edging Bladed For Constructing Beveled And Angled Contours For Landscaping Purposes, shows a beveled blade that attaches to a motorized edging machine. The blade bevels away from the motorized edging machine. Accordingly, if the blade is being used around the periphery of a garden, the blade can only make a beveled edge that bevels toward the garden. The blade cannot be used to crate a beveled edge that bevels away from the garden without running the motorized edging machine within the boundaries of the garden. However, running a motorized edging machine within the boundaries of the garden is counter productive since the motorized edging machine will run over the garden and damage the plants or flowers within the garden.

U.S. Pat. No. 4,002,205 to Falk, entitled Horticultural Device and U.S. Pat. No. 2,555,441 to Hackney, entitled Lawn Edging Cutter both show motorized edging machines with beveled blades. Again, the blades being used are beveled away from the motorized edging machine. Accordingly, if the blade is being used around the periphery of a garden, the blade can only make a beveled edge that bevels toward the garden.

Additionally, the beveled blades used in the cited prior art references have complex structures, where multiple pieces of metal must be joined together at precise angles. This makes the cost of such beveled edging blades very expensive. When a motorized edging machine is used, the edging blade often strikes roots, stones, pavement, wall and other objects that are beneath the edge or adjoin landscaping. As such, blades on motorized edging machines do not enjoy long lives. Blades often bend, or even if not bent, they wear out quickly. Consequently, a landscaper or homeowner has no choice but to continuously buy expensive beveled edging blades if they want to continue to use their motorized edging machine to make beveled edges.

A need therefore exists for an improved edging blade design that can be attached to a motorized edging machine and can create a beveled edge that bevels toward the motorized edging machine. A need also exists for an improved beveled edging blade that is low cost and is resistant to bending and other damage. These needs are met by the present invention as described and claimed below.

SUMMARY OF THE INVENTION

The present invention is an edger blade assembly for cutting a beveled edge using a motorized edging machine. The edger blade assembly is a structure that includes a blade element. The blade element has two opposing free ends. Between the two free ends is a flat middle section, two diverging sections that extend outwardly from the flat middle section and two converging sections that extend between the diverging sections and the two free ends, respectively. The blade element is bent at an acute angle between the flat middle section and the diverging sections. The blade element is bent at an obtuse angle between the diverging sections and the converging sections, thereby forming a beveled blade structure from a single segment of steel.

A straight reinforcement element extends between the diverging sections of the blade element. The reinforcement element has a length that is longer than the flat middle section of the blade element. The reinforcement element adds strength to the blade element and makes the blade element highly resistant to bending without adding significant cost to the assembly.

BRIEF DESCRIPTION OF THE DRAWINGS

For a better understanding of the present invention, reference is made to the following description of exemplary embodiments thereof, considered in conjunction with the accompanying drawings, in which:

FIG. 2 is front view of the embodiment of the edging blade assembly of FIG. 1 shown in operation on a motorized edging machine.

DETAILED DESCRIPTION OF THE INVENTION

Figure 1:
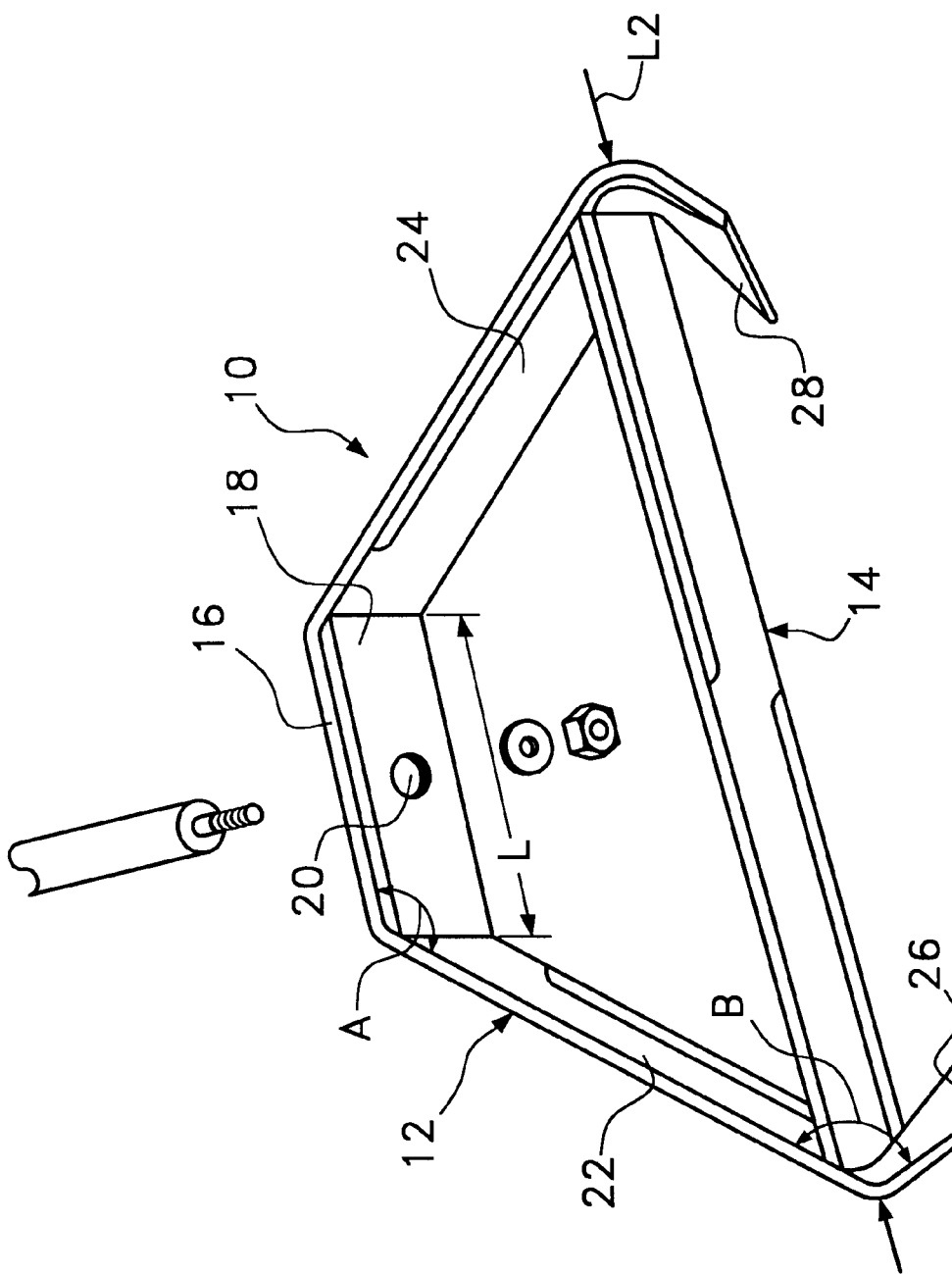
FIG. 1 is a perspective view of one preferred embodiment of the present invention edging blade assembly, shown in conjunction with the drive shaft of a motorized edging machine.

Although the present invention edging blade can be used on many different types of motorized edging machines, such as hand-held edgers and the like, the present invention platform device is particularly well suited for use with wheeled motorized edging machines that are pushed along the periphery of the area being edged. Accordingly, by way of example, the present invention will be described in conjunction with a wheeled motorized edging machine.

Referring to FIG. 1, an exemplary embodiment of an edging blade assembly 10 is shown in accordance with the present invention. The edging blade assembly 10 is made from only two separate pieces of steel, which are the blade element 12 and the reinforcement element 14. The blade element 12 has a flat middle section 16. The flat middle section 16 has a length L1 that is the narrowest part on the edging blade assembly 10. In the shown embodiment, the flat middle section 16 is reinforced with an optional reinforcement plate 18, wherein the reinforcement plate 18 is welded to the flat middle section 16 of the blade element 12.

A mounting aperture 20 extends through the flat middle section 16 of the blade element 12 and the reinforcement plate 18. The mounting aperture 20 is disposed in the geometric center of the edging blade assembly 10 so that the edging blade assembly 10 is equally balanced about the point of the mounting aperture 20.

The flat middle section 16 of the edging blade is the center section of the larger contoured blade element 12. The blade element 12 extends away from either end of the flat middle section 16 at a predetermined angle A. The predetermined angle A is an acute angle of between 30 degrees and 70 degrees. The sections of the blade element 12 that extend away from the flat middle section 16 are herein referred to as the diverging sections 22, 24 of the blade element 12.

The diverging sections 22, 24 of the blade element 12 are spread apart by length L1 at the flat middle section 16 of the blade element 12. However, the diverging sections 22, 24 of the blade element 12 diverge apart to a maximum length L2, which is the widest part of the edging blade assembly 10. After the point of maximum divergence, the blade element 12 bends into a converging orientation. The converging sections 26, 28 of the blade element 12 extend to the free ends of the blade element 12. The angle B between the diverging sections 22, 24 of the blade element 12 and the converging sections 26, 28 of the blade element 12 is an obtuse angle of between 110 degrees and 170 degrees. The bend in the blade element 12 causing angle B is not a sharp bend. Rather, the blade element 12 is bent with a generous radius of curvature for a purpose which will later be explained.

The flat middle section 16 of the blade element 12 and the diverging sections 22, 24 of the blade element are configured in the same plane. However, the converging sections 26, 28 of the blade element 12 are twisted slightly so as to cause the converging sections 26, 28 to lay in their own unique angled planes. The angled planes of the converging sections 26, 28 of the blade element enable the converging sections 26, 28 of the blade element 12 to direct dirt out of the beveled trench being formed by the edging blade assembly 10.

The diverging sections 22, 24 of the blade element 12 and the converging sections 26, 28 of the blade element 12 are sharpened along the edge that faces the direction of rotation for the edging blade assembly. The sharpened edges increase the ease at which the edging blade assembly can cut through soil and roots.

To prevent the blade element 12 from bending when in use, the reinforcement element 14 is disposed between the diverging sections 22, 24 of the blade element 12. The reinforcement element 14 retains the diverging sections 22, 24 of the blade element 12 at a set spacing and orientation, thereby preventing any one half of the blade element 12 from bending toward or away from the opposite half. The edge of the reinforcement element 14 that faces the direction of rotation can be sharpened to help the reinforcement element 14 pass through soil and roots. The length of the reinforcement element is at least twice as long as the length L1 of the flat middle section 16 of the blade element 12.

Referring to FIG. 2, the edging blade assembly 10 is shown on a motorized edging machine 40. As can be seen, the edging blade assembly creates a beveled edge that bevels toward the motorized edging machine 40. Accordingly, the motorized edging machine 40 can create an outward bevel around the periphery of a garden without having to be within the garden.

Also in FIG. 2, it can be seen that the curved area between the diverging sections 22, 24 of the blade element 12 and the converging sections 26, 28 of the blade elements creates a curved trough 42 at the bottom of the beveled edge. The curved trough is aesthetically appealing and provides the beveled edge with a professional appearance that cannot be readily duplicated with a shovel or spade.

It will be understood that the embodiments of the present invention described and illustrated herein are merely exemplary and a person skilled in the art can make many variations to the embodiments shown without departing from the scope of the present invention. For example, the angles of the bends in the blade element can be altered within described ranges. Lengths of the various sections of the blade element can also be varied to many different lengths other than is shown. All such variations, modifications and alternate embodiments are intended to be included within the scope of the present invention as defined by the appended claims.

What is claimed is:

1. An edger blade assembly, comprising:
   a blade element having two free ends, said blade element having a flat middle section, two diverging sections that extend outwardly from said flat middle section and two converging sections that extend between said diverging sections and said two free ends, respectively, wherein said blade element is bent at an acute angle between said flat middle section and said diverging sections and blade element is bent at an obtuse angle between said diverging sections and said converging sections;
   a straight reinforcement element extending between said diverging sections of said blade element, wherein said reinforcement element has a length that is longer than said flat middle section of said blade element; and
   a mounting aperture defined by said blade element in said flat middle section of said blade element.

2. The assembly according to claim 1, wherein said blade element has two long side edges that extend between said two free ends, wherein at least one of said side edge surfaces is sharpened along at least a portion of said diverging sections and said converging sections.

3. The assembly according to claim 1, wherein said reinforcement element has two long side edges and at least a section of each of said long side edges is sharpened.

4. The assembly according to claim 1, wherein said converging sections of said blade element are angled to propel soil away from said assembly when said blade element is rotating.

5. The assembly according to claim 1, wherein said flat middle section of said blade element has a predetermined length and said diverging sections of said blade element diverge apart to a distance that is at least as great as twice said predetermined length.

6. The assembly according to claim 1, wherein said blade element has a constant width throughout said flat middle section, said diverging sections and said converging sections.

7. The assembly according to claim 1, wherein said blade element is bent along a predetermined radius of curvature between said diverging sections and said converging sections.

8. A blade assembly, comprising:
   a single blade element having two free ends and a middle section, wherein said blade element is bent to diverge away from said middle section on either side of said middle section; and
   a reinforcement element spanning between points on said blade element a predetermined distance from said middle section, wherein said reinforcement element is parallel to said middle section and at least twice as long as said middle section.

9. The device according to claim 8, wherein said blade element is bent to converge between the sections of said blade element that diverge and said free ends.

10. The device according to claim 8, further including a reinforcement plate coupled to said middle section of said blade element.

* * * * *